United States Patent Office 2,816,922
Patented Dec. 17, 1957

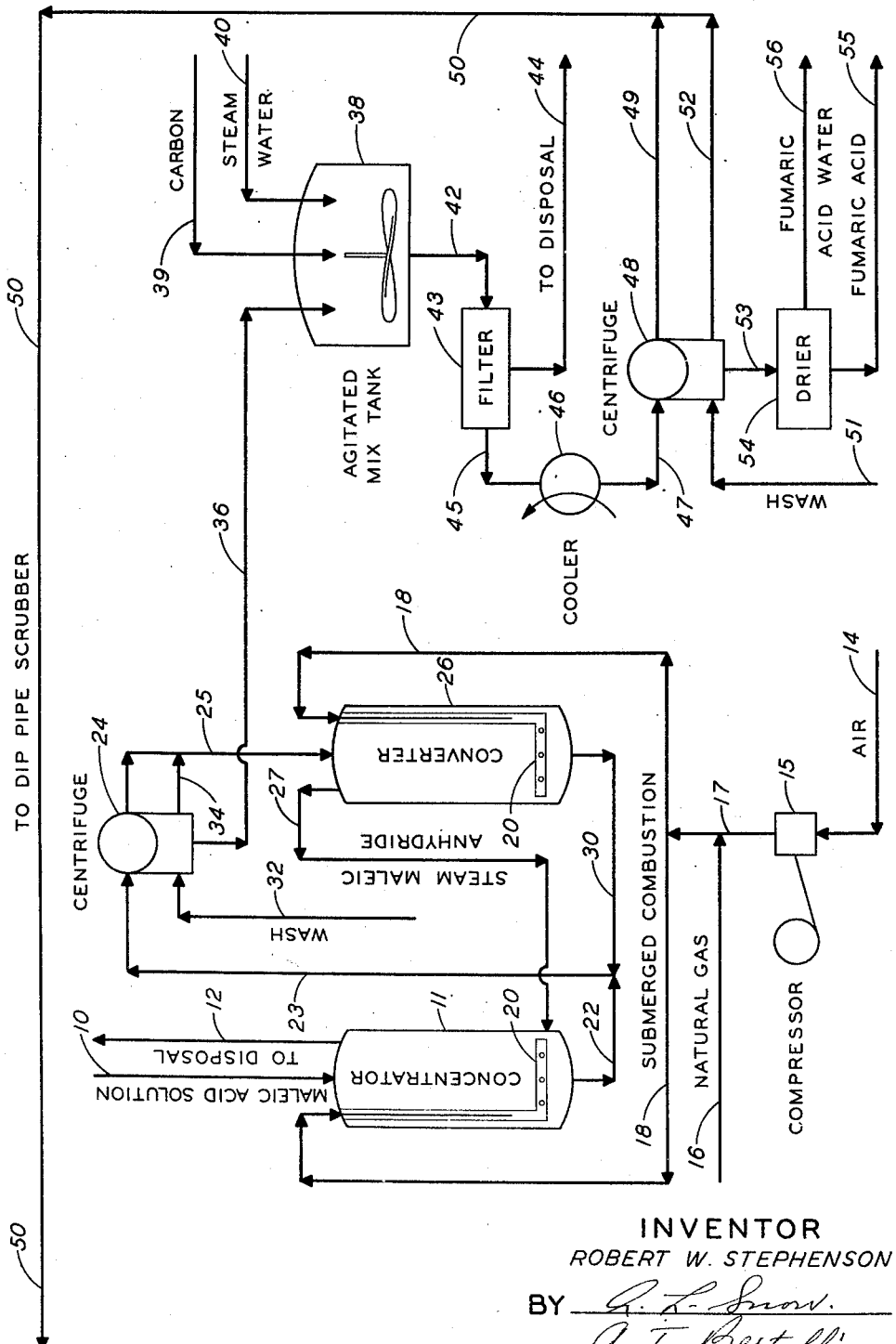

2,816,922

PRODUCTION OF FUMARIC ACID

Robert W. Stephenson, El Cerrito, Calif., assignor to California Research Corporation, San Francisco, Calif., a corporation of Delaware Application May 17, 1954, Serial No. 430,036

3 Claims. (Cl. 260—537)

This invention relates to a process for the production of fumaric acid. More particularly, the invention has to do with a process for the treatment of maleic acid liquors or solutions to convert the maleic acid into fumaric acid of a high purity in a high yield.

Great quantities of maleic acid, together with certain organic impurities are found in the scrub liquors involved in the production of phthalic anhydride. These liquors can contain as much as 30 weight percent maleic acid, quantities of the order of 10 to 20 weight percent maleic acid in the scrub liquors being quite common. These liquors therefore represent a valuable source of raw material for the production of the more valuable fumaric acid isomer by conversion of the maleic acid into fumaric acid.

Attempts have heretofore been made to convert maleic acid into the more valuable fumaric acid isomer by processes including the catalytic action of acids, halogens and ultra-violet light. When an acid, such as hydrochloric acid, is employed, large amounts of acid are required, thus rendering the process expensive and occasioning undesirable corrosion problems. On the other hand, the use of ultraviolet light or a halogen, such as bromine, have been found to be substantially ineffective, probably because they are absorbed by other materials in the maleic acid liquor.

In accordance with the present invention, it has been found that the maleic acid content of liquors containing the same can be almost quantitatively converted to fumaric acid of a high degree of purity, i. e., of the order of 99 percent and better.

Broadly, the present invention contemplates a process for the production of fumaric acid from aqueous maleic acid liquors, particularly those resulting from the production of phthalic anhydride, involving the steps of heating in a conversion zone a concentrated maleic acid liquor, that is, one from which a major proportion of the water has been removed, to vaporize additional water and to convert the maleic acid into fumaric acid, and recovering the fumaric acid. In a more specific embodiment of the invention, an aqueous maleic acid liquor concentrated to a maleic acid content of about 70 to 90 weight percent is heated to a temperature between about 250° F. and 400° F. to volatilize additional water and to produce a reaction product mixture including crude fumaric acid and unconverted maleic acid, separating the fumaric acid from the mixture, and heating the fumaric acid-freed mixture in the presence of additional concentrated maleic acid liquor for conversion of maleic acid into more fumaric acid.

In a further more specific embodiment of the invention, a maleic acid liquor containing, for example, about 10 to 30 weight percent maleic acid is heated in a concentration zone at a temperature at which water vaporizes and is removed overhead but below a temperature at which substantial quantities of maleic anhydride distill over, i. e., at a temperature up to as high as about 250° F., down to as low a temperature as, for example, about 212° F. At this stage of the process the maleic acid liquor is concentrated to a maleic acid content of the order of about 70 to 90 percent, preferably around 80 percent. The thus concentrated maleic acid liquor is then heated in a conversion zone to a higher temperature, that is, at a temperature above about 250° F., preferably around 275–300° F., up to a temperature below which charring of the organic material is prevented or inhibited, that is, up to a temperature of about 400° F. In the conversion stage of the process, which may require six to sixty hours, additional water is vaporized, and the product mixture comprises maleic anhydride, fumaric acid and unconverted maleic acid. The overhead from the conversion step, comprising water vapor and maleic anhydride, are recycled to the concentration zone. On the other hand, the bottom slurry fraction from the conversion zone, comprising crude fumaric acid, maleic acid and other organic materials, such as phthalic acid, is joined with a fresh stream of concentrated maleic acid leaving the concentrator, or less desirably water, to improve its flow characteristics, and the resulting mixture conducted to a separation zone, e. g., a centrifuge or filter. The solid crude fumaric acid crystals are here separated from the slurry, the mother liquor being returned to the conversion zone. The crude fumaric crystals can then further be refined, as by decolorizing, e. g., with carbon, filtering, washing and drying.

The invention will now further be described in connection with the appended drawing which illustrates suitable apparatus and process flow for carrying out a preferred embodiment of the invention, including a concentration zone, a conversion zone, and auxiliary means and equipment for purification of the fumaric acid.

Referring now to the drawing in detail, maleic acid liquor or solution is introduced through line 10 into concentration zone 11. The maleic acid liquor, conveniently of about 10–35 percent maleic acid content, is advantageously obtained from the scrubbing section (dip pipe scrubber) of a phthalic anhydride plant, wherein the gases from the converters employed in the vapor phase catalytic conversion of the appropriate hydrocarbon, e. g., naphthalene or xylene, are passed through the aqueous adsorption medium of maleic acid. In concentration zone 11, the maleic acid liquor is concentrated by the distillation or evaporation of water therefrom, the water vapor being removed from the concentration zone through line 12. As already indicated, the temperature in the concentration zone is such at which water distills over without appreciable quantities of maleic anhydride. A suitable temperature has been found to lie within about the range of 212° F. to 250° F. While the method and means of supplying the requisite heat for concentration of the maleic acid liquor are not critical, it has been found advantageous to supply the heat to the concentration zone, as well as to the conversion zone, hereinafter more particularly described, by means of the submerged combustion of a suitable gas, e. g., natural or artificial gas, in both zones. A satisfactory system for such submerged combustion, illustrated in the drawing, includes an air inlet 14, air compressor 15, gas inlet 16, the mixture of gas and air being passed through line 17 into manifold line 18, whence it is introduced into concentration and conversion zones, and burned therein in combustion chamber represented by the numeral 20.

Following concentration of the maleic acid liquor, now having a maleic acid content of about 70–90 percent, preferably around 80 percent, the concentrated maleic acid liquor is withdrawn from the concentration zone through line 22, and through line 23 conducted into separation zone 24. Separation zone 24 is provided with any suitable means, e. g., centrifuge or filter capable of separating the solids and mother liquor of the slurry, more particularly hereinafter described. Upon starting of operations, the concentrated maleic acid solution is merely sent through separation zone 24 without further treatment, and passed through line 25 into conversion zone 26. This zone, as well as the concentration zone, can be a tank or vessel, resistant to acid attack provided for this purpose with acid resisting material, e. g., carbon or brick.

In conversion zone 26, wherein the concentrated maleic acid liquor is allowed to remain for a period varying from 6 to 60 hours, conversion of maleic into fumaric is effected by raising the temperature of the liquor, preferably by submerged combustion, as already described, above about 250° F., preferably at least about 280° F. During conversion additional water and maleic anhydride are vaporized. These are withdrawn overhead through line 27 and passed to the concentartion zone. A bottom slurry fraction comprising fumaric acid, unconverted maleic acid and phthalic acid are withdrawn from converter 26 through line 30, passed into line 23 and there joined or mixed with concentrated maleic acid liquor freshly issuing from concentrator 11 through line 22. Mixing of the stream from the concentrator with the slurry from the converter improves the flow characteristics of the slurry, and makes it easier to transport or pump. The resulting mixed stream of slurry and concentrated maleic acid liquor is conducted into the separation zone for the separation or isolation of crude fumaric crystals from the mother liquor or filtrate, which is removed through line 25 and conducted into conversion zone 26. Upon separation, the crude fumaric acid crystals are washed with water introduced through line 32, the washings being removed through line 34, thence into line 25 for introduction into conversion zone 26. In some instances, accumulations of impurities might occur which are not removed in separation zone 24, in which event line 25 may be provided with a bleed-off line for removal of such impurities and thus prevent an undue build-up of the same.

Crude fumaric acid, containing impurities, such as phthalic acid, is withdrawn from the separation zone through line 36, and is further treated to purify it. In a preferred embodiment of the invention, the purification treatment involves decolorization, recrystallization, and drying. Thus crude fumaric acid withdrawn from separation zone 24 through line 36 is sent to the decolorization zone. The decolorization zone comprises a tank or vessel 38 provided with means for agitation. Decolorizing agent, e. g., carbon, is introduced into the mix tank through line 39, an amount of about 1 to 2 percent carbon, based on the fumaric acid, being satisfactory. In mix tank 38 sufficient water and heat are employed to solubilize the fumaric acid, the higher the temperature the greater the solubility of the fumaric acid in the water, and hence the lesser amounts of water required to form the fumaric acid solution. Exceedingly high temperatures, however, are less desirably employed because of the adverse effect on ease of operations. On the other hand exceedingly low temperatures require larger amounts of water, thus rendering the process bulky, and resulting in loss of product and a less pure product upon the subsequent recrystallization operation and the separation of the mother liquor from the fumaric acid crystals. In general, it is preferred to operate at a temperature of about 180° F. to about 210° F., employing from 10 to 12 parts by weight of water per part of fumaric acid, with the larger amounts of water being employed at the lower end of the temperature range, and lesser amounts of water at the higher temperatures. A convenient way of supplying the heat to the mix tank is by charging thereto part of the requisite water as steam, as illustrated, through line 40.

Following the decolorization operation the hot fumaric acid solution is withdrawn from mix tank 38 through line 42 and sent to filtering zone 43 to remove the carbon from the fumaric acid solution. Carbon is withdrawn through line 44, while the filtrate is withdrawn through line 45 and passed through cooling zone 46 to crystallize fumaric acid. A suitable cooling temperature is one which will effect crystallization of substantially all of the fumaric acid, allowing the impurities, e. g., phthalic acid, to remain dissolved in the mother liquor. Cooling temperatures of the order of 100° F. have been found satisfactory.

Following cooling the slurry of fumaric acid crystals is withdrawn from the cooling zone through line 47 and conducted to a separation zone, e. g., centrifuge 48, for the separation of fumaric acid crystals and mother liquor, the mother liquor being removed through line 49 and returned, if desired, through line 50, to the dip pipe scrubber for recovery of the phthalic acid. Solid fumaric acid crystals are washed by means of water introduced into separation zone 48 through line 51, the washings being removed from the separation zone through line 52, and, if desired, conducted to dip pipe scrubber through line 50. The washed crystals are withdrawn through line 53 and introduced into drier 54, such as a drum drier. Dry fumaric acid is withdrawn from the drier through line 55, while fumaric acid water is withdrawn through line 56.

As an example of the practice of the invention, production of fumaric acid from maleic acid liquor obtained from a phthalic anhydride plant was carried out essentially with an equipment arrangement and process flow as shown in the attached drawing. During the start-up of operation, appropriate portions of the equipment were put on stream as needed, e. g., product from the concentrator was not fed to the converter until the concentrator was filled. When equilibrium was attained, the following conditions prevailed: Maleic acid liquor containing one and one-half pounds of maleic acid per gallon was fed to a converter at the rate of four gallons per hour. Tempearture in the converter was held at about 245°–250° F. by means of submerged combustion. The non-volatile product from the concentrator was fed to a converter and therein given an average residence time of fifty-eight hours. Temperature in the converter was held at approximately 280° F. by means of submerged combustion. Volatile products from the converter were recycled to the concentrator and the maleic acid-fumaric acid slurry was circulated through heated lines and a filter for fumaric acid removal. Periodically, flow to the filter was interrupted and the accumulated fumaric acid was washed with water and the wash liquor was recycled to the converter. The washed, crude fumaric acid was removed from the filter at the rate of slightly over six pounds per hour on a dry basis. This crude fumaric acid was accumulated and periodically purified as follows: One part crude fumaric acid was dissolved by heating to 200° F. in eleven parts of water. To this hot solution was added two hundredths part of decolorizing carbon per part of fumaric acid and after a contacting period the carbon was filtered from the solution. The filtered solution was cooled to 100° F. while stirring to crystallize the purified fumaric acid. The crystal crop was filtered from the mother liquor and washed with cold water. The washed crystals were dried giving a white powder which assayed over 99% fumaric acid. Fumaric acid recovery rate, as such, amounted to approximately eighty-five percent of the original maleic acid charge rate and including fumaric acid remaining in the crystallization mother liquor and wash, an over-all yield of better than ninety-five percent of fumaric acid on the original maleic acid charge was obtained.

Obviously many modifications and variations of the invention, as hereinbefore set forth, may be made without departing from the spirit and scope thereof and, therefore,

I claim:

1. A process for noncatalytically converting maleic acid contained in relatively dilute aqueous maleic acid solutions containing up to about 30% by weight of maleic acid to fumaric acid, which comprises heating the dilute maleic acid to an elevated temperature below about 250° F. in a concentration zone to evaporate water from the dilute solution and produce a concentrated maleic acid solution containing about 70 to 90% by weight of maleic acid, heating the concentrated maleic acid to a temperature above 250° F. and below about 400° F. in a conversion zone to produce a slurry of fumaric acid in aqueous maleic acid, withdrawing a vapor stream comprising steam and maleic anhydride from the conversion zone and passing it into the concentration zone, withdrawing said slurry from the conversion zone, diluting the withdrawn slurry with concentrated maleic acid solution, separating the diluted slurry into a liquid phase comprising aqueous maleic acid and a solid phase comprising fumaric acid and returning the liquid phase to the conversion zone.

2. A process for non-catalytically converting maleic acid to fumaric acid which comprises forming an aqueous solution of maleic acid having a maleic acid content in the range 70 to 90% by weight, heating the maleic acid solution in a conversion zone to a temperature above 250° F. and below 400° F. to form a slurry of solid fumaric acid in aqueous maleic acid solution, withdrawing said slurry from the conversion zone, diluting it with aqueous maleic acid solution, filtering the diluted slurry to separate a filter cake consisting essentially of fumaric acid and a filtrate comprising aqueous maleic acid and passing the filtrate into the conversion zone.

3. Process according to claim 2 wherein the maleic acid liquor is heated to a temperature between about 275° F. to 300° F.

References Cited in the file of this patent

UNITED STATES PATENTS 2,208,519     Spence et al.  ----------- July 16, 1940

OTHER REFERENCES

Tanatar: Berichte Deutsch. Chem. Gessell, vol. 23, Referate, p. 433 (1890).